United States Patent
Reinhardt

(10) Patent No.: US 9,114,801 B2
(45) Date of Patent: Aug. 25, 2015

(54) METHOD AND DEVICE FOR CONTROLLING AN INTERNAL COMBUSTION ENGINE

(71) Applicant: Dr. Ing. h.c. F. Porsche Aktiengesellschaft, Stuttgart (DE)

(72) Inventor: Michael Reinhardt, Neulingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/455,956

(22) Filed: Aug. 11, 2014

(65) Prior Publication Data

US 2015/0065300 A1 Mar. 5, 2015

(30) Foreign Application Priority Data

Sep. 4, 2013 (DE) .......................... 10 2013 109 638

(51) Int. Cl.
*B60W 10/04* (2006.01)
*B60W 10/184* (2012.01)
*B60W 10/06* (2006.01)

(52) U.S. Cl.
CPC ............. *B60W 10/184* (2013.01); *B60W 10/06* (2013.01); *B60W 2510/18* (2013.01)

(58) Field of Classification Search
None
See application file for complete search history.

(56) References Cited

U.S. PATENT DOCUMENTS 7,998,027 B2 * 8/2011 Doering et al. ............... 477/183
2010/0324790 A1 12/2010 Wurthner et al.
2014/0214310 A1 * 7/2014 Morimura et al. ............ 701/113

FOREIGN PATENT DOCUMENTS

DE 102005027615 A1 2/2006
DE 102007010295 A1 9/2008

* cited by examiner

*Primary Examiner* — Dirk Wright
(74) *Attorney, Agent, or Firm* — Leydig, Voit & Mayer, Ltd.

(57) ABSTRACT

A method for controlling an internal combustion engine of a motor vehicle includes interrupting a fuel supply in an overrun mode of the motor vehicle above a switch-off rotational speed of the internal combustion engine. The fuel supply is switched on again when a starting rotational speed (n1) is reached or undershot. A brake pressure gradient of a brake system of the motor vehicle is detected and the starting rotational speed (n1) is varied as a function of the brake pressure gradient.

9 Claims, 3 Drawing Sheets

METHOD AND DEVICE FOR CONTROLLING AN INTERNAL COMBUSTION ENGINE

CROSS REFERENCE TO RELATED APPLICATIONS

Priority is claimed to German Patent Application No. DE 10 2013 109 638.7, filed on Sep. 4, 2013, the entire disclosure of which is hereby incorporated by reference herein.

FIELD

The present invention relates to a method for controlling an internal combustion engine of a motor vehicle, wherein a fuel supply in the overrun mode of the motor vehicle is interrupted above a switch-off rotational speed of the internal combustion engine, and when a starting rotational speed is reached or undershot the fuel supply is resumed again.

In addition, the invention relates to a device for controlling an internal combustion engine of a motor vehicle comprising an overrun mode detection unit for detecting an overrun mode of the motor vehicle, a rotational speed detection unit for detecting a rotational speed of the internal combustion engine and comprising a brake pressure gradient detection unit for detecting a brake pressure gradient of a brake system of the motor vehicle.

The invention finally relates to a motor vehicle drive train having an internal combustion engine for making available drive power.

BACKGROUND

In the field of motor vehicle engineering by means of internal combustion engines, it is generally known that the fuel supply in the overrun mode of the internal combustion engine is interrupted in order to reduce the fuel consumption of the internal combustion engine. In this context it is generally known to initiate the fuel supply again if a predefined restarting rotational speed or an idling rotational speed of the internal combustion engine is reached. This restarting rotational speed occurs at approximately 1000 rpm in current series-manufactured vehicles. The consumption of the internal combustion engine can generally be reduced further if the restarting rotational speed is reduced further, since as a result the motor vehicle can be operated for longer in the overrun mode without a fuel supply. It is thus disadvantageous here that in the case of strong deceleration of the motor vehicle, such as for example in the case of emergency braking, the injection of the internal combustion engine is not started quickly enough and the rotational speed of the internal combustion engine drops below a critical rotational speed and cannot be started again through the fuel supply alone.

DE 102005027615 A1 discloses a method and a device for controlling an internal combustion engine in which a setpoint rotational speed at which the fuel supply is resumed again with an overrun cutoff is increased if a vehicle brake is activated. It is disadvantageous here that not every braking process can cause the internal combustion engine not to start up again, that the setpoint rotational speed is unnecessarily increased and as a result the fuel consumption cannot be reduced significantly.

It is also known from DE 102007010295 A1 to increase the setpoint rotational speed during an overrun cutoff if a brake pressure limiting value is exceeded. It is disadvantageous here that as a result of the detection of the brake pressure emergency braking is under certain circumstances detected too late and the setpoint rotational speed is increased too late, with the result that unintentional switching off of the internal combustion engine can occur.

SUMMARY

In an embodiment, the present invention provides a method for controlling an internal combustion engine of a motor vehicle includes interrupting a fuel supply in an overrun mode of the motor vehicle above a switch-off rotational speed of the internal combustion engine. The fuel supply is switched on again when a starting rotational speed (n1) is reached or undershot. A brake pressure gradient of a brake system of the motor vehicle is detected and the starting rotational speed (n1) is varied as a function of the brake pressure gradient.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

Exemplary embodiments of the invention are illustrated in the drawing and will be explained in more detail in the following description, in which.

DETAILED DESCRIPTION

Figure 1:
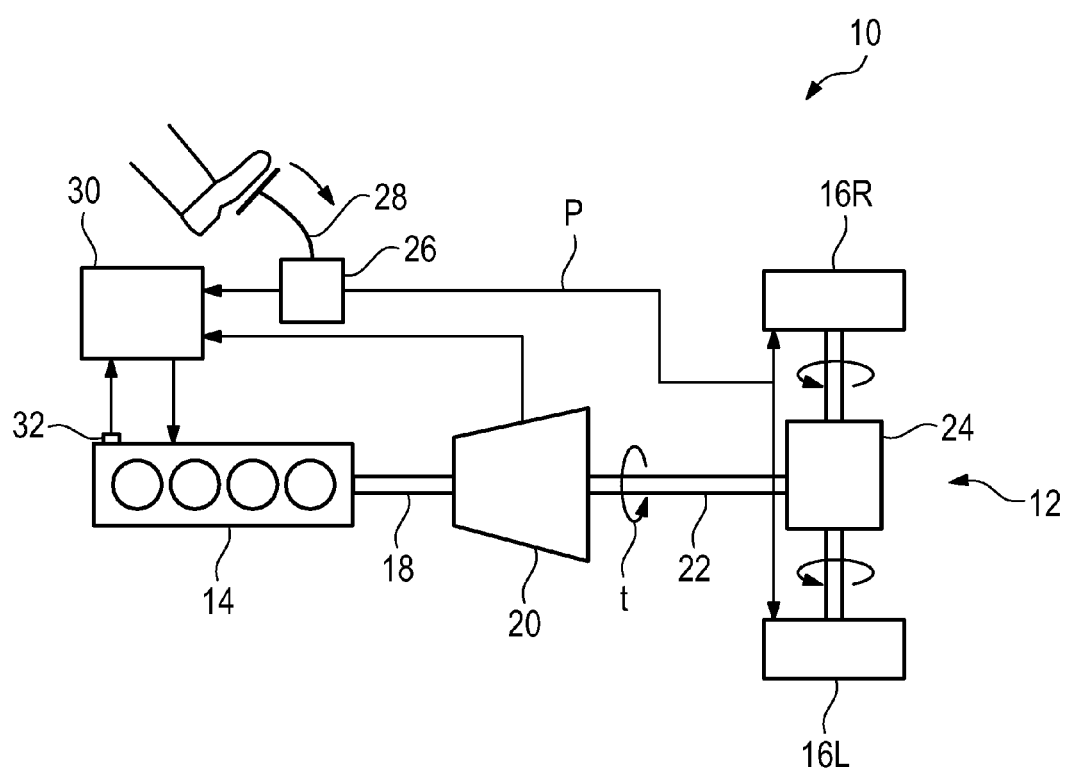
FIG. 1 shows a schematic illustration of a motor vehicle drive train having a control unit for controlling the internal combustion engine.

An aspect of the invention provides a method and a device for controlling an internal combustion engine, wherein the fuel consumption is reduced and the risk of unintentional switching off of the internal combustion engine in the case of an overrun cutoff is reduced.

In an embodiment, the invention provides a method in which a brake pressure gradient of a brake system is detected and the starting rotational speed is varied as a function of the brake pressure gradient.

In an embodiment, the invention provides a device in which a control unit which is designed to carry out the method according to the invention.

In an embodiment, the invention provides a drive train in which a device for controlling the internal combustion engine according to the present invention.

By virtue of the fact that the brake pressure gradient is detected, a normal brake process can be differentiated significantly from emergency braking and emergency braking can be detected before a critical brake pressure occurs, with the result that the starting rotational speed can be adapted early and unintentional switching off of the internal combustion engine can be avoided. As a result, in general the starting rotational speed of the internal combustion engine can be reduced without the risk of unintentional switching off of the internal combustion engine occurring in the event of emergency braking, as a result of which the fuel consumption can generally be lowered.

The object of the present invention is therefore solved completely.

In one preferred embodiment, the starting rotational speed is increased as a function of the brake pressure gradient.

As a result, the reliability can be increased, since the probability of reducing the rotational speed of the internal combustion engine below a critical rotational speed can be avoided.

It is also preferred if the starting rotational speed is increased if the brake pressure gradient exceeds a predefined threshold value.

As a result, emergency braking can be detected reliably with low technical complexity.

It is also preferred if in addition a brake pressure is detected and the starting rotational speed is increased as a function of the brake pressure.

As a result, the reliability of the method can be increased further since the absolute value of the brake pressure is also taken into account.

It is also preferred if the starting rotational speed is increased if the brake pressure exceeds a predefined threshold value.

As a result, the technical complexity can be reduced further since the brake pressure has to be compared only with the threshold value.

It is also preferred if the starting rotational speed is increased by a predefined value.

As a result, it is possible to dispense with complex calculation of the starting rotational speed, as a result of which the technical complexity for the determination of the starting rotational speed is reduced further.

It is also preferred if the starting rotational speed is increased by at least 150 rpm.

As a result, the internal combustion engine can be reliably prevented, with low technical complexity, from switching off unintentionally in the event of emergency braking.

Overall, by means of the present invention emergency braking can be detected early with low technical complexity and unintentional switching off of the internal combustion engine or deactivation of the internal combustion engine can be avoided by varying the starting rotational speed, with the result that the starting rotational speed at which the fuel supply is resumed again in the overrun mode can be significantly reduced, and the fuel consumption can be generally lowered.

Of course, the features above and the features which are to be explained below can be used not only in the respectively specified combination but also in other combinations or alone without departing from the scope of the present invention.

FIG. 1 is a schematic illustration of a motor vehicle which is denoted generally by 10. The motor vehicle 10 has a drive train 12 which contains in the present case an internal combustion engine 14 for making available drive power. The drive train 12 serves to drive driven wheels 16L, 16R of the motor vehicle 10.

The internal combustion engine 14 is connected to a transmission 20 via a crank shaft 18. The transmission 20 is connected via an output shaft 22 and a differential gear 24 to the driven wheels 16R, 16L in order to transmit drive torque t to the driven wheels 16R, 16L.

The motor vehicle 10 has a brake system 26 which is actuated by means of a brake pedal 28 and generates a brake pressure P in order to brake the driven wheels 16R, 16L. The brake system 26 can operate hydraulically, electrically or electro-hydraulically.

The internal combustion engine 14 is assigned a control unit 30 which controls the internal combustion engine 14 and, in particular, sets the fuel supply of the internal combustion engine 14. The control unit 30 is connected to the brake system 26, wherein the brake system 26 of the control unit 30 makes available a signal which corresponds to the brake pressure P. The control unit 30 is additionally connected to the transmission 20, wherein the drive state of the transmission unit 20 is detected by means of a sensor, in particular a torque sensor of the transmission unit 20. In this context it is detected, in particular, whether the motor vehicle 10 is driven by the drive torque t or whether the torque which is transmitted to the transmission 20 by the driven wheels 16R, 16L is greater than the torque which is transmitted by the internal combustion engine 14 via the crank shaft 18. It is therefore detected whether the motor vehicle 10 is in a drive state or in the overrun mode.

If the motor vehicle 10 is in the overrun mode and the internal combustion engine 14 is turning at a rotational speed above a switch-off rotational speed, detected by means of a rotational speed sensor 32, the control unit 30 interrupts the fuel supply to the internal combustion engine 14. If the rotational speed of the internal combustion engine 14 drops to a restarting rotational speed, the control unit 30 switches the fuel supply on again, with the result that the internal combustion engine 14 is driven again. If the rotational speed of the internal combustion engine 14 drops below a critical rotational speed in the overrun mode without the fuel supply being switched on, the internal combustion engine 14 cannot be started by switching on the fuel supply again in the normal way. The internal combustion engine 14 is deactivated in this case and has to be started again by means of a starter.

The switch-off rotational speed and the restarting rotational speed are preferably identical and are usually approximately 1000 rpm and correspond to the idling rotational speed.

By reducing the restarting rotational speed the fuel consumption of the internal combustion engine 14 can be generally reduced, with the result that the restarting rotational speed should be given a setting which is as low as possible. The lower the restarting rotational speed is set, the greater the risk that the internal combustion engine 14 will enter a region of the critical rotational speed at which it is not possible to start by restarting the fuel supply. In particular, this critical rotational speed can be reached when the motor vehicle 10 is braked strongly, with the result that when the restarting rotational speed is detected the fuel supply is switched on too late and the internal combustion engine 14 is switched off or is deactivated unintentionally.

The control unit 30 detects the brake pressure P and increases the restarting rotational speed as a function of a brake pressure gradient which is determined in the control unit 30 from the brake pressure P, with the result that strong deceleration of the motor vehicle 10, that is to say emergency braking, can be detected early and the restarting rotational speed can be raised to a value at which unintentional switching off of the internal combustion engine 14 is ruled out. As a result, the risk of the rotational speed of the internal combustion engine 14 dropping below the critical rotational speed can be minimized.

Figure 2A:
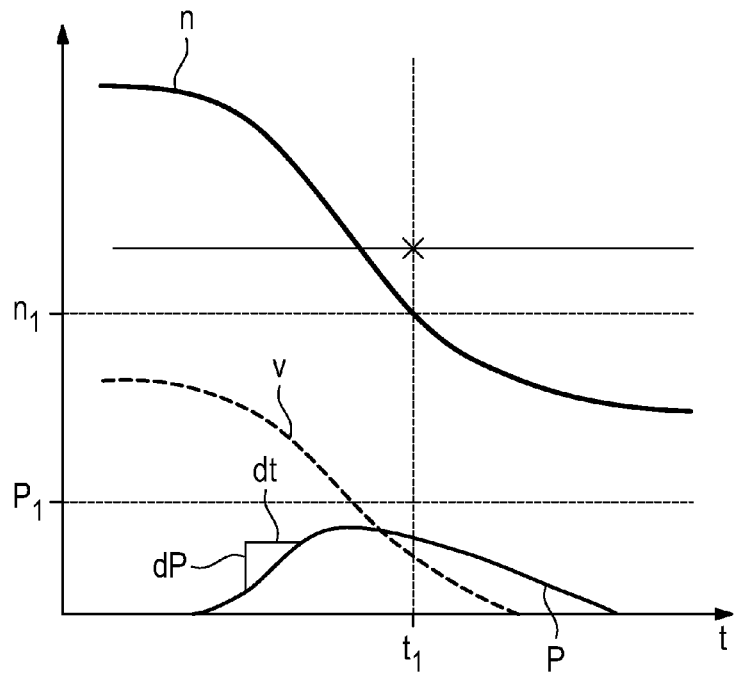
FIGS. 2a, b show diagrams explaining variation of the starting rotational speed.

Schematic diagrams explaining the variation in the restarting rotational speed as a function of the brake pressure P are illustrated in FIG. 2a.

In FIG. 2a, the engine speed n, the vehicle speed v and the brake pressure P are illustrated for the overrun mode plotted over time. In the overrun mode in which the fuel supply is interrupted, the engine speed n drops until the engine speed n has reached the restarting rotational speed n1 at t1 and the control unit 30 switches on the fuel supply again. The vehicle speed v illustrated in FIG. 2a drops in accordance with the engine speed n, wherein the brake pressure P is below a predefined brake pressure threshold value P1. Since the brake pressure P is low in the situation illustrated in FIG. 2a, emergency braking does not occur and the restarting rotational speed n1 does not have to be corrected in order to avoid unintentional switching off of the internal combustion engine 14.

By analogy with the brake pressure P, a gradient dP/dt of the brake pressure P can also be used to vary the restarting rotational speed n1 as illustrated schematically in FIG. 2a. Since the gradient dP/dt of the brake pressure P is lower in the situation illustrated in FIG. 2a than a predefined threshold value, the restarting rotational speed n1 is not varied.

Figure 2B:
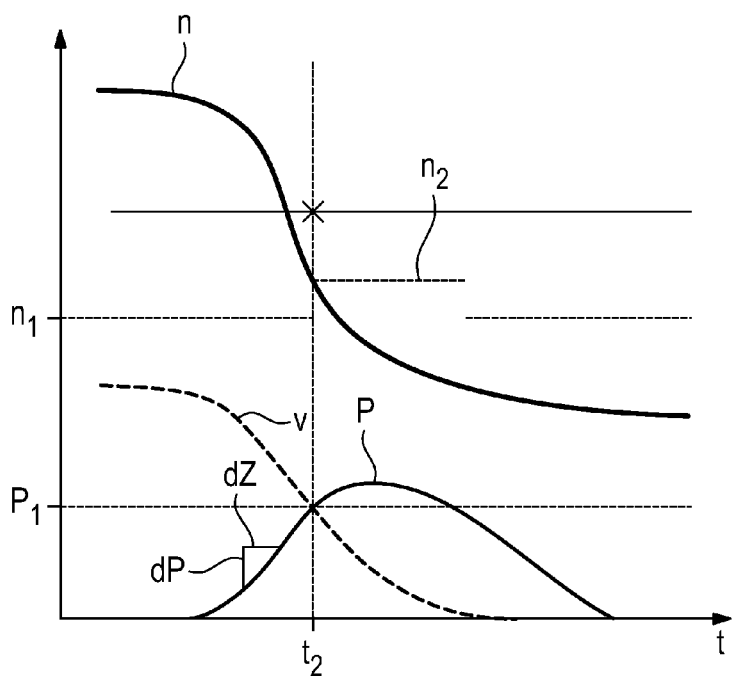

The engine speed n, the vehicle speed v and the brake pressure P are illustrated schematically for emergency braking in FIG. 2b. The engine speed n drops in the overrun mode in which the fuel supply is switched off up to the time t2, wherein the brake pressure P1 rises strongly. At the time t2, a brake pressure threshold value P1 is reached at which the restarting rotational speed n1 is raised to a value n2. If the engine speed n reaches the restarting rotational speed n2, the control unit 30 switches the fuel supply on, with the result that unintentional switching off of the internal combustion engine 14 can be reduced.

In addition, FIG. 2b shows the gradient dP/dt of the brake pressure P which can be used in a way analogous to the brake pressure P in order to set the restarting rotational speed n2. In this context it is apparent that the maximum gradient dP/dt of the brake pressure P is reached earlier than the absolute threshold value P1, with the result that a variation in the restarting rotational speed n2 can occur earlier on the basis of the gradient dP/dt and the fuel supply can therefore restart more reliably.

As a result, unintentional switching off of the internal combustion engine 14 in the event of emergency braking can be prevented and nevertheless the restarting rotational speed n1 for the normal operating mode can be reduced to a low value and therefore fuel can be saved.

Figure 3:
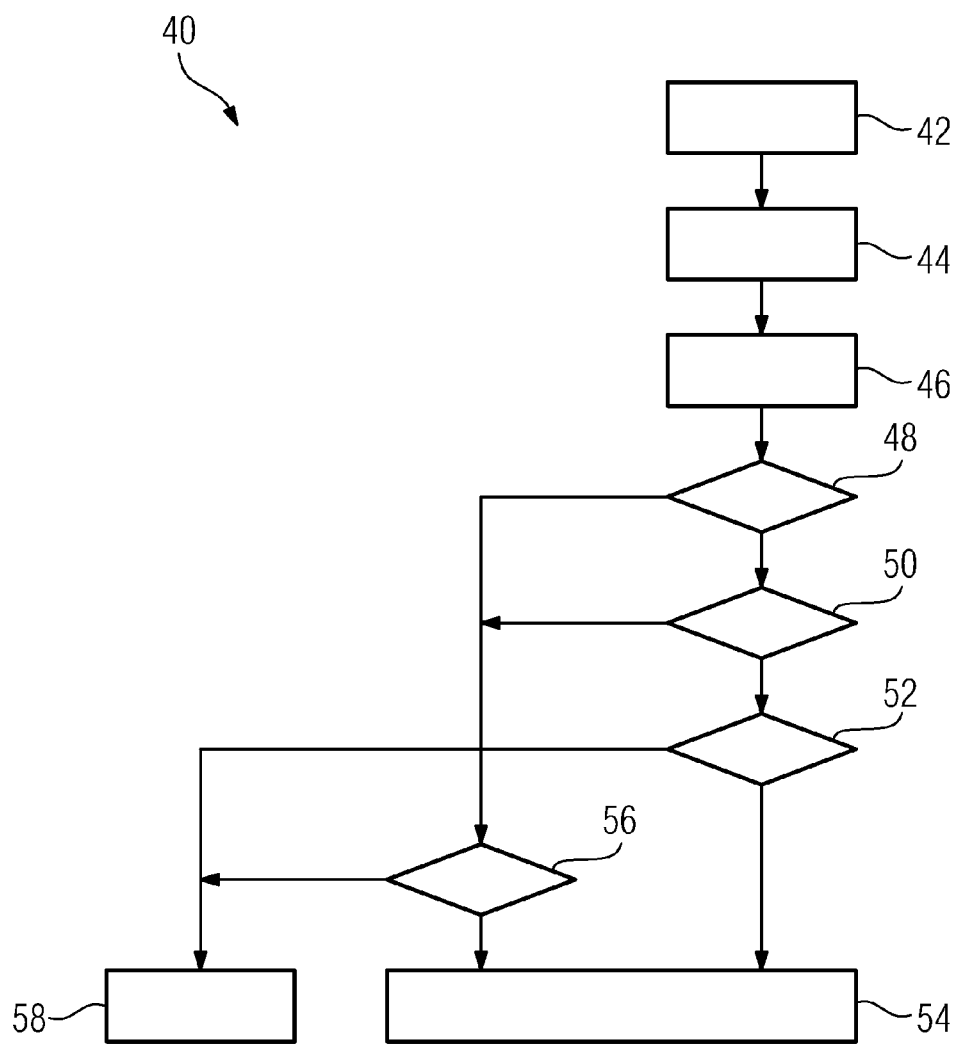
FIG. 3 shows a schematic flowchart explaining the method according to the invention.

In FIG. 3, the method for setting the restarting rotational speed is illustrated schematically in a flowchart and is generally denoted by 40.

At 42 the overrun mode of the motor vehicle 10 is detected and in a subsequent step the fuel supply of the internal combustion engine 14 is interrupted by the control unit 30, as is shown at 44. At 46, the brake pressure P is detected and the gradient dP/dt of the brake pressure P is determined.

At 48 it is checked whether the gradient dP/dt is lower than a predefined threshold value. If the gradient dG/dt is lower than the predefined threshold value, at 50 the absolute value of the brake pressure P is checked to determine whether the brake pressure P is lower than a predefined threshold value. At 52 it is checked whether the engine speed n is higher than the restarting rotational speed n1, and if the engine speed is higher than the restarting rotational speed n1 the fuel supply remains interrupted, as is shown at 54.

If it has been detected at 48 or 50 that the brake pressure gradient dG/dt or the brake pressure P is greater than the respective threshold value, it is checked at 56 whether the engine speed n is higher than the restarting rotational speed n2. If this is the case, the fuel supply remains interrupted, as is shown at 54, and if this is not the case the fuel supply is switched on again, as is shown at 58. The fuel supply is also switched on again if it has been detected at 52 that the engine speed n is lower than the restarting rotational speed n1.

As a result, the fuel supply can therefore be reliably switched on again as a function of the brake pressure P, of the brake pressure gradient dP/dt and of the engine speed n even in the event of emergency braking, in order to avoid unintentional switching off of the internal combustion engine 14.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling an internal combustion engine of a motor vehicle, the method comprising:
    interrupting a fuel supply in an overrun mode of the motor vehicle above a switch-off rotational speed of the internal combustion engine;
    switching the fuel supply on again when a starting rotational speed (n1) is reached or undershot;
    detecting a brake pressure gradient of a brake system of the motor vehicle; and
    varying the starting rotational speed (n1) as a function of the brake pressure gradient.

2. The method as recited in claim 1, wherein the starting rotational speed (n1) is increased as a function of the brake pressure gradient.

3. The method as recited in claim 1, wherein the starting rotational speed (n1) is increased if the brake pressure gradient exceeds a predefined threshold value.

4. The method as recited in claim 1, further comprising detecting a brake pressure (P); and
    increasing the starting rotational speed (n1) as a function of the detected brake pressure (P).

5. The method as recited in claim 4, wherein the starting rotational speed (n1) is increased if the brake pressure (P) exceeds a predefined threshold value (P1).

6. The method as recited in claim 1, wherein the starting rotational speed (n1) is increased by a predefined value.

7. The method as recited in claim 6, characterized in that the starting rotational speed is increased by at least 150 rpm.

8. A device for controlling an internal combustion engine of a motor vehicle, the device comprising:
    an overrun mode detection unit configured to detect an overrun mode of the motor vehicle,
    a rotational speed detection unit configured to detect a rotational speed (n) of the internal combustion engine;

a brake pressure gradient detection unit configured to detect a brake pressure gradient of a brake system of the motor vehicle; and a control unit configured to:
- interrupt a fuel supply in an overrun mode of the motor vehicle above a switch-off rotational speed of the internal combustion engine,
- switch the fuel supply on again when a starting rotational speed (n1) is reached or undershot,
- detect a brake pressure gradient of a brake system of the motor vehicle, and
- vary the starting rotational speed (n1) as a function of the brake pressure gradient.

9. A motor vehicle drive train comprising:

an internal combustion engine configured to provide available drive power; and a device for controlling the internal combustion engine as recited in claim 8.

\* \* \* \* \*